United States Patent [19]

Roderiguez et al.

[11] Patent Number: 5,272,246

[45] Date of Patent: Dec. 21, 1993

[54] POLYESTER COPOLYMER FIBER HAVING ENHANCED STRENGTH AND DYEABILITY PROPERTIES

[75] Inventors: Joseph A. Roderiguez, Charlotte; Theodore D. Meiss, Matthews, both of N.C.

[73] Assignee: Hoechst Celanese Corporation, Somerville, N.J.

[21] Appl. No.: 37,473

[22] Filed: Mar. 24, 1993

Related U.S. Application Data

[60] Continuation of Ser. No. 839,157, Feb. 21, 1992, abandoned, which is a division of Ser. No. 575,452, Aug. 28, 1990, Pat. No. 5,135,697.

[51] Int. Cl.$^5$ .................... C08G 63/02; C08G 63/16
[52] U.S. Cl. .................... 528/272; 524/600; 528/271; 528/274; 528/295.3; 528/300; 528/302; 528/308; 428/224
[58] Field of Search .................... 264/210.6; 524/600; 528/271, 272, 274, 295.3, 300, 302, 308; 428/224

[56] References Cited

U.S. PATENT DOCUMENTS

| | | | |
|---|---|---|---|
| 3,932,356 | 1/1976 | Takagi | 528/274 |
| 3,960,817 | 6/1976 | Morawetz et al. | 528/272 |
| 4,113,704 | 9/1978 | MacLean et al. | 528/289 |
| 4,248,997 | 2/1981 | Ihida | 528/272 |

*Primary Examiner*—John Kight, III
*Assistant Examiner*—Terressa Mosley
*Attorney, Agent, or Firm*—Philip P. McCann

[57] ABSTRACT

The invention is a method of producing a polyester filament which has a superior combination of tensile, dyeability and shrinkage properties. The method comprises forming a polyester copolymer from a mixture consisting essentially of terephthalic acid (TA) or dimethyl terephthalate (DMT), ethylene glycol, adipic acid, and pentaerythritol wherein the adipic acid is added in an amount of between 1.3 and 3.2 weight percent of the terephthalic acid and pentaerythritol is added in the amount from 175 to 700 ppm by weight of terephthalic acid; forming the filament from the copolymer, drawing the copolymer filament, and heat-setting the drawn filament. The invention also comprises the enhanced fiber formed by the process having an atmospheric dyeability greater than that of an unenhanced PET produced under identical conditions except for the addition of the adipic acid and pentaerythritol, a modulus of greater than 3.0 g/denier, a tenacity from about 5 to 7 g/denier and a hot air shrinkage of less than 10%.

9 Claims, No Drawings

POLYESTER COPOLYMER FIBER HAVING ENHANCED STRENGTH AND DYEABILITY PROPERTIES

This is a continuation of application Ser. No. 07/839,157 filed Feb. 21, 1992, now abandoned, which is a division of application Ser. No. 07/575,452 filed Aug. 28, 1990, now U.S. Pat. No. 5,135,697.

FIELD OF THE INVENTION

The present invention relates to the manufacture of polyester fibers for textile applications, and in particular relates to an enhanced polyester copolymer fiber material which demonstrates a combination of improved tensile properties and improved dyeability.

BACKGROUND OF THE INVENTION

Polyester has long been recognized as a desirable material for textile applications. The basic processes for the manufacture of polyester are relatively well known and straight forward, and fibers from polyester can be appropriately woven or knitted to form textile fabric. Polyester fibers can be blended with other fibers such as wool or cotton to produce fabrics which have the enhanced strength, durability and memory aspects of polyester, while retaining many of the desired qualities of the natural fiber with which the polyester is blended.

As with any fiber, the particular polyester fiber from which any given fabric is formed must have properties suitable for manufacture, finishing, and end use of that fabric. Typical applications include both ring and open-end spinning, either with or without a blended natural fiber, weaving or knitting, dyeing and finishing. In addition, it has long been known that synthetic fibers such as polyester which are initially formed as extruded linear filaments will exhibit more of the properties of natural fibers such as wool or cotton if they are treated in some manner which changes the linear filament into some other shape. Such treatments are generally referred to in the art as texturizing, and can include false twisting, crimping and certain chemical treatments.

In a homopolymeric state, polyester exhibits good strength characteristics. Typical measured strength characteristics include tenacity, which is generally expressed as the grams per denier required to break a filament, and the modulus, which refers to the filament strength at a specified elongation ("SASE"). Tenacity and modulus are also referred to together as the tensile characteristics or "tensiles" of a given fiber. In relatively pure homopolymeric polyester, the tenacity will generally range from about 4.5 to about 7 g/denier.

In many applications, of course, it is desirable that the textile fabric be available in a variety of colors, accomplished by a dyeing step. Substantially pure polyester, however, is not as dyeable as most natural fibers, or as would otherwise be desired, and therefore must usually be dyed under conditions of high temperature, high pressure, or both, or at atmospheric conditions with or without the use of swelling agents, commonly referred to as "carriers". Accordingly, various techniques have been developed for enhancing the dyeability of polyester.

One technique for enhancing the dyeability of polyester is the addition of various functional groups to the polymer to which dye molecules or particles such as pigments attach more readily, either chemically or physically, depending upon the type of dyeing technique employed. Common types of additives include molecules with functional groups that tend to be more receptive to chemical reaction with dye molecules than polyester. This often include carboxylic acids (particularly dicarboxylic or other multifunctional acids), and organometalic sulfate or sulfonate compounds.

It is known in the art that adipic acid can be added to terephthlatic acid (TA) or dimethyl terephthalate (DMT) to produce a polyester with improved dyeability properties of the fibers. Adding increased amounts of adipic acid during production of polyester will increase the dyeability of the resulting fiber. However, there are a number of disadvantages associated with the addition of adipic acid for the purposes of enhancing dyeability. These disadvantages are shown in the loss of strength of the fiber as indicated by the lower modulus and tenacity measurement of the fiber.

It is also known in the art that pentaerythritol at low levels of less than about 450 ppm by weight of the TA or DMT can be incorporated into polyester for providing improved strength of the fiber including the modulus and tenacity of the fiber. However, at levels of greater than 450 ppm, the pentaerythritol may result in decreased strength and dyeability of the fiber. U.S. Pat. No. 4,113,704 to MacLean et al discloses use of pentaerythritol as a branching agent to enhance dyeability within a limited range and also to enhance the productivity of polyester.

It is also known that polyethylene glycol (PEG) ca offer various advantages when incorporated into polyester for textile fibers, including improved dyeing characteristics. Nevertheless, there are a number of disadvantages associated with the application of PEG to polyester as in the case of adding adipic acid to the polyester, in particular, the diminished strength of the fiber.

Accordingly, there remains a need to develop a suitable additive for polyester fibers that enhance the dyeing properties of the polyester fiber while also enhancing such characteristics as strength, hot air shrinkage (HAS), and dyeability.

SUMMARY OF THE INVENTION

It is therefore an object of the present invention to provide a method of producing a polyester filament which has a superior combination of dyeability, tensile and hot air shrinkage properties. The method comprises forming a polyester copolymer from a mixture consisting essentially of terephthalic acid (TA) or dimethyl terephthalate (DMT), ethylene glycol, adipic acid, and pentaerythritol and optionally a solution of adipic acid, ethylene glycol, and bishydroxyethyladipate (BHEA), which is the product of adipic acid and ethylene glycol. The adipic acid is added in the amount of 1.3 to 3.1 weight percent based on TA or DMT and the pentaerythritol is added in the amount of between about 175 and about 700 ppm based on TA or DMT. The copolymer is drawn into filament at a draw ratio and temperature sufficient to produce the desired enhanced tensile properties in the filament, after which the drawn filament is heated at a temperature sufficiently high enough to set the desired enhanced tensile properties in the copolymer filament and to maintain the shrinkage of the copolymer filament substantially the same as the shrinkage of the nonenhanced polymer filament, but without lowering the dyeability of the resulting fiber below the dyeability of the nonenhanced fiber.

Because of the relationship between tensile strength and dyeability, the invention also provides a method of enhancing the dyeability of polyester fiber while maintaining the tensiles of that fiber substantially equivalent to its tensile strength when not enhanced. In a similar manner, the invention provides a method of concurrently enhancing both dyeability and tensile strength, as well as maintaining the hot air shrinkage compared to a nonenhanced polyester fiber or a polyester fiber enhanced with either one of the adipic acid or pentaerythritol.

The foregoing and other objects, advantages and features of the invention, and the manner in which the same are accomplished, will become more readily apparent upon consideration of the following detailed description of the invention taken in conjunction with the examples which illustrate exemplary embodiments.

DETAILED DESCRIPTION OF THE PREFERRED EMBODIMENT

The invention comprises forming a polyester copolymer from the mixture consisting essentially of terephthalic acid (TA) or dimethyl terephthalate (DMT), ethylene glycol, adipic acid, and pentaerythritol with the adipic acid being added in the amount of about 1.3 to 3.2 weight percent of the TA or DMT and the pentaerythritol being added in the amount of between 175 and 700 ppm of the TA or DMT. Furthermore, the adipic acid and ethylene glycol can be added as an adipic acid/ethylene glycol/ bishydroxyethyl adipate solution such that the amount of the adipic acid remains in the range of 1.3 to 3.2 weight percent of the TA or DMT.

As is known to those familiar with the commercial production of polyester, the polyester polymer can be formed from a starting mixture of terephthalic acid and ethylene glycol, or from dimethyl terephthalate and ethylene glycol. The polyester may be manufactured using a batch process or a continuous process. The reaction proceeds through the well known steps of esterification and condensation to form polyethylene terephthalate, commonly referred to as polyester or PET. A number of catalysts or other additives have been found to be useful in promoting either the esterification or condensation reactions, or in adding certain properties to the polyester. For example, antimony compounds are commonly used to catalyze the condensation reaction and inorganic compounds such as titanium dioxide ($TiO_2$) are commonly added as delustrants or for other similar purposes.

The polyester is formed as a viscous liquid which is forced through a spinneret head to form individual filaments; a process generally referred to in the art as "spinning". The spun filaments are subsequently drawn, heat-set, crimped, dried and cut with the appropriate lubricating finishes added in a conventional manner. It will be understood by those familiar with textile manufacturing in general and synthetic fiber manufacture in particular that the word "spinning" has two connotations in the art, the first meaning being a term used to describe the manufacture of fiber from a polymer melt, and the second being the twisting of fibers together—natural, synthetic, or blended—to form spun yarn. Both terms will be used herein in their conventional sense. The polyester copolymer of the present invention is produced by previously described production methods for polyester, i.e., esterification followed by polymerization via condensation. A batch process or continuous process may be employed, and catalysts and/or other typical additives may be employed. It will be understood that the presence or absence of such other materials does not affect the essential techniques or results of the present invention, although they may modify or enhance the polyester copolymer in the same desirable manner as for polyester itself.

A batch process of the present invention starts with esterification performed at atmospheric pressure and at 180° to 220° C. The reactor will be loaded with dimethyl terephthalate, ethylene glycol and a catalyst as is conventionally carried out in a customary batch polyester process. After esterification is complete, the adipic acid and pentaerythritol are added. Other additives such as delustrants ($TiO_2$), thermostabilizers, optical brighteners and/or bluing agents, etc., may be added at this initial polymerization stage. The polymerization stage is run at 280°–300° C. at a strong vacuum of 0.3 to 3.0 mm Hg pressure. The target intrinsic viscosity of the polymer is 0.5 to 0.65 deciliters/gm. Alternatively, the batch process can be made incorporating terephthalic acid, ethylene glycol, catalyst, adipic acid and pentaerythritol.

The above batch process can be run in a manner such that the adipic acid and/or pentaerythritol is loaded with the other raw materials at the beginning of the esterification process. Furthermore, it is contemplated for a batch operation that some of the adipic acid and/or pentaerythritol may be added with the raw materials at the beginning of the esterification process, while the remaining additives are added at the beginning of the polymerization stage.

Alternatively, a continuous process of the present invention starts with the flow of raw materials including terephthalate acid (TA) and ethylene glycol (EG) in a ratio of TA/EG of 1.1 to 1.4 mole ratio. The adipic acid and pentaerythritol may be added with the TA and EG, or they may be added during, or immediately after the esterification phase of the process. Like the batch process, other additives and/or catalysts may be fed into the reactor with TA and EG, as is customary with continuous operations for polyester. In all the above processes, the adipic acid and pentaerythritol can be added as a solution of adipic acid and ethylene glycol and BHEA.

In the primary esterification stage of the continuous process, the reactor is run at a pressure of 20 to 50 psi and a temperature of 240° to 260° C. In the conventional secondary esterification stage of the continuous process, the reactor is run at atmospheric pressure and at a temperature of 250 to 280° C. At the low polymerization stage, the reactor is run at a pressure of 15 to 50 mm Hg and at a temperature of 265° to 285° C. At the final polymerization stage, the continuous reactor is operated at a pressure of 0.3 to 3.0 mm Hg and at a temperature of 275 to 305° C.

The heat-setting temperatures employed in a drawing process are raised high enough to set the desired tensile properties in the copolymer filament and to maintain the shrinkage of the copolymer filament substantially the same as the shrinkage of the nonenhanced polyester filament. In this regard, heat-setting temperatures most preferred are generally greater than 120° C. and preferably between about 140° and 240° C. In conventional processes, heat-setting temperatures greater than 150° C. cause the dyeability of the fiber to decrease below acceptable levels for a product which is desirably atmospherically dyeable. The enhancement of the fiber provided by the present invention, of course, also exhibits when the fiber is dyed under pressurized conditions.

As set forth herein, the temperatures expressed for heat setting have been measured from the middle of the last heat-set roll and then corrected for shell loss to give a reasonable approximation of the contact temperature of the shell of the heated roll with which the fiber is in contact.

It is known that an increase in adipic acid during the production of polyester copolymers will increase the dyeability and lower the strength of the fiber. Furthermore, it is also known that the use of pentaerythritol in a polyester copolymer at low levels will increase the strength of the fiber but can also diminish the dyeability thereof. The use of the present invention boosts the physical properties and the dyeability of the fiber to values greater than the separate values. Specifically the tensiles of the fiber relative to control fiber at equivalent dyeability or improved dyeability are improved. These higher fiber tensiles have been demonstrated to translate into improved textile yarn strengths in various examples. Alternatively, and depending upon the application desired for the resulting fiber, yarn or fabric, the present invention can be used to boost the dyeability of a given fiber while maintaining tensiles substantially equivalent to an unmodified or controlled fiber. Thus, the present invention provides a unique balance of improved physical properties and also improved dyeability of the polyester copolymer compared with other polyesters and polyester copolymers.

EXAMPLE

Table 1 illustrates a number of the characteristics of staple fiber formed according to the present invention, using terephthalic acid and ethylene glycol with 2.6 weight percent adipic acid based on TA and 580 ppm pentaerythritol based on TA. The fiber is referenced as Example 1. The control PET fiber, C1, was a nominal 1.0 dpf (denier per filament) polyester homopolymer formed under otherwise identical conditions relative to Example 1. The control PET/adipate copolymer fiber, C2, was a nominal 1.0 dpf polyester copolymer formed under otherwise identical conditions. The PET/polyethylene glycol copolymer C3 was produced using sufficient polyethylene glycol to produce a copolymer having 2.5% by weight polyethylene glycol. The polyethylene glycol (PEG) had an average molecular weight of approximately 400 grams per mole. The PET/pentaerythritol polymer, C4, was produced at 520 ppm pentaerythritol based on TA.

The dyeability of the samples was measured against the dyeability (calibrated as 100.0) of commercially produced 1.0 dpf unenhanced polyester fiber and corrected for dpf variations. The dying condition set forth is atmospheric dyeing (ATM DYE) having the following parameters: 50:1 liquor ratio; 8% Tanadel IM (Butyl Benzoate); 1 g/l DS-12 swetling dispersing agent commercially from Syborn Corporation, Wellford, S.C.; Acetic Acid—pH (4.5–5.0); 2% Disperse blue 27; 3° F./min rate of rise; and 60 mins @ 210° F.

TABLE 1

| Samples | ATM DYE | MODULUS | TENACITY | HAS |
| --- | --- | --- | --- | --- |
| C1 | 100 | 4.07 | 5.48 | 10.2 |
| C2 | 102 | 3.54 | 4.86 | 9.0 |
| C3 | 120 | 2.79 | 5.00 | 11.9 |
| C4 | 95 | 3.71 | 5.9 | 5.6 |

TABLE 1-continued

| Samples | ATM DYE | MODULUS | TENACITY | HAS |
| --- | --- | --- | --- | --- |
| 1 | 112 | 4.37 | 5.58 | 9.7 |

C1 - Control unenhanced PET
C2 - Control PET enhanced with adipic acid
C3 - Control PET enhanced with polyethylene glycol
C4 - Control PET enhanced with pentaerythritol As used in Table 1, tenacity is the breaking load expressed as grams per denier, the modulus is the strength at 10% elongation expressed in grams per denier; elongation is the percentage increase in length the filament can undergo before breaking, the hot air shrinkage (HAS) is the percent decrease in length of the filament when exposed to air at 400° F.; tenacity, modulus and elongation being determined in accordance with ASTM D-3822 for tensile properties.

Comparison of the physical properties as found in Table 1 illustrates the property advantages of the invention over prior art fibers. One of the goals of the present invention is to attain a polyester copolymer having an atmospheric dye of greater than 100% of an unenhanced control fiber as previously defined, a modulus of greater than 3.00 g/denier, a tenacity of between 5 and 7 g/denier, and a HAS of less than 10%. Example 1 meets all the foregoing criteria having an atmospheric dye of 112%, a modulus of 4.37 g/denier, a tenacity of 5.58 g/denier, and a HAS of 9.7%. This combination of properties is superior to that of the unenhanced PET homopolymer in control example C1, which has an atmospheric dye of 100% and a HAS of 10.2%. In Control example C2, it was found that although the modulus and the HAS properties are met, the tenacity property was not met. Control example C3, has good atmospheric dye and tenacity but, it was found that the modulus was 2.79 g/eenier and the HAS is higher than desirable. Control example C4 lacks dyeability characteristics having a dyeability inferior to that of the nonenhanced polyester C1.

The improvement in the filament strength as shown above relative to standard polyesters and other polyester copolymers is expected to be a key factor in obtaining the highest possible rotor speeds in open-end spinning. Present developments indicate that rotor speeds of 100,000 rpm or greater may be available in the near future. In other spinning techniques, such increased strength is similarly required. Ring spinning at present speeds of 20,000 rpm, jet spinning, and friction spinning all call for fibers having improved physical characteristics. The technology of the present invention is expected to provide good spinning efficiencies at such speeds while producing a product that remains dyeable with dispersed dyes under atmospheric conditions, particularly when combined with selected low dpf fiber (eg. 1.5 dpf or less). The advantages of the invention, however, are not limited to any particular size fiber.

Although the applicants do not wish to be bound by any particular theory that they may have regarding the invention, it is recognized that many of the copolymer's physical characteristics reflect a degree of crystallinity of a polymer. In the production of filament from the polymer, if all other factors are held substantially constant, the tensiles of the filament may be lowered when additives, such as adipic acid or pentaerythritol are present. Copolymers particularly exhibit lower tensiles because it is believed that the added comonomers interrupt the otherwise homogenous polymer and changes its crystallinity.

Alternatively, dyeability is enhanced by certain additives precisely because the homogeneity of the polymer is physically interrupted, giving a dye molecule or a pigment a physical or chemical opportunity to enter the polymer structure. Similarly, dyeability is discouraged when crystallinity is increased because of the lack of potential reaction sites, and it is therefore discouraged by higher temperature heat-setting.

Shrinkage is another variable which must be controlled in fibers and resulting fabrics. Shrinkage is increased by a lesser degree of crystallinity because the more amorphous regions, or the regions of the copolymer or additive in the polymer chain, tend to collapse under heat to a greater extent than do the more oriented or homogenous portions of the polymer. Shrinkage is correspondingly decreased by a higher degree of crystallinity. All variables being equal, desirable low shrinkage properties tend to be competitive with desirable dyeability properties Another variable which is desirably controlled is the extent of orientation of the polymer. It is known to those familiar with the nature of polymers, that orientation refers to a somewhat ordered condition in which the long polymeric molecules are in a greater degree of linear relationship to one another, but are not in the lattice-site and bonding relationships with one another that would define a crystal lattice. All other factors remaining equal, increased orientation short of crystallization tends to result in increased shrinkage, as application of heat tends to randomize the otherwise oriented molecules. The randomization tends to be reflected as a decrease in fiber length as the linearly oriented molecules move into less linear relations with one another.

As is further known to those familiar with such a process, the drawing conditions under which the filament is initially formed are variables other than the heat-setting temperature that controllably affect the orientation of the polymer, and therefore, a number of the properties which relate to the orientation such as tensiles, dyeability, and shrinkage. As used herein, the drawing conditions include the draw ratio, natural draw ratio and draw temperature. Draw ratio is defined as the ratio of the final length in which the drawn filament is heat set to the initial length of the filament prior to drawing. Other variables aside, a greater draw ratio increases the orientation of the polymer forming the filament, thereby increasing the tensiles and the shrinkage of the resulting fiber, but decreasing the dyeability. A lower draw ratio decreases the tensiles and shrinkage of the fiber and increases the dyeability.

The natural draw ratio for a fiber is the draw ratio at which the fiber will no longer "neck". Alternatively, this can be expressed as the amount of draw required to end necking and begin strain hardening of a drawn fiber. As is known to those familiar with filament processes, when a filament is first drawn, it forms one or more drawn and undrawn portions in which the drawn portions are referred to as the "neck". At the natural draw ratio, however, the neck and undrawn portions disappear and the filament obtains a uniform cross section which then decreases uniformly (rather than in necks and undrawn portions) as the fiber is drawn further. The natural draw ratio reflects the degree of orientation of the undrawn spun fiber, with a lower natural draw ratio reflecting a higher degree of orientation, and vice versa.

The natural draw ratio is measured by placing a length of spun tow into clamps mounted on an Instron tensile tester, stretching the bundle until break and measuring the resultant stress. Preferred natural draw ratio is from 100 to 130%.

Draw temperature is defined as that temperature of the drawing medium used to induce the spun filament to yield. The medium is applied prior to heat setting. Typical examples of a medium include steam, liquid and heated rolls. The lower the temperature, the less crystallinity in the yarn and the converse holds.

These relationships hold true for polyester homopolymers, as well as for copolymers such as the present invention, so that the draw ratio can generally be selected to give desired tensiles within a given range defined by the nature of the polymer or copolymer. The contribution of the invention is the ability to, in combination, increase the dyeability, as well as the tensile strength. In other words, prior to the present invention, the tensile strength and dyeability of polyester filament always moved in inverse relationship to one another.

Results of the present invention are demonstrated by the data summarized in Tables 2 and 3. This data was generated based on normal regression analysis of conducted experiments. Table 2 shows data including draw ratio (% natural draw ratio), draw temperature, heat set temperature, dyeability, strength, elongation and hot air shrinkage for regular polyester fibers (control) heat set at 130°, 140° and 150° C. and fibers formed using 2.7 weight percent adipic acid based on TA and 580 ppm pentaerythritol based on TA heat set at 130°, 140° and 150° C. Table 3 summarizes the relationship between varying amounts of the adipic acid and pentaerythritol added to the resulting fiber characteristics.

TABLE 2

| Property | Fiber | Heat Set Temperature (°C.) | | |
|---|---|---|---|---|
| | | 130 | 140 | 150 |
| ATM DYE | Controls | 109 | 106 | 103 |
| | Examples | 129 | 126 | 122 |
| MODULUS | Controls | 3.81 | 3.96 | 4.11 |
| | Examples | 3.69 | 3.77 | 3.85 |
| TENACITY | Controls | 5.09 | 5.19 | 5.29 |
| | Examples | 5.41 | 5.40 | 5.39 |
| ELONGATION | Controls | 34 | 32 | 30 |
| | Examples | 52 | 48 | 45 |
| HAS | Controls | 10 | 9.5 | 9 |
| | Examples | 9 | 8 | 8 |

ATM DYE = Atmospheric Dye
HAS = Hot Air Shrinkage
Draw Ratio (% Natural Draw Ratio) = 105%
Draw Temperature = 72° C.

TABLE 3

| | Weight % Adipic Acid | Penta | Ten | Mod | HAS | ATM DYE |
|---|---|---|---|---|---|---|
| Control | 0 | 0 | 4.84 | 3.92 | 5.5 | 100 |
| 1 | 2.2 | 410 | 5.33 | 4.55 | 4.7 | 104 |
| 2 | 2.6 | 485 | 5.09 | 4.37 | 4.8 | 102 |
| 3 | 3.1 | 580 | 5.25 | 4.61 | 5.3 | 107 |

Draw Ratio (% natural draw ratio) = 115%
Draw Temperature 66° C.
Heat set temperature 200° C.
Penta = pentaerythritol ppm of TA Thus, it is apparent that there has been provided in accordance with the invention, a polyester copolymer and a method of preparing the polyester copolymer incorporating adipic acid and pentaerythritol that fully satisfies the objects, aims and advantages as set forth above. While the invention has been described in conjunction with specific embodiments thereof, it is evident That which is claimed is:

1. An enhanced polyester fiber which has a superior combination of tensile, dyeability and shrinkage properties said fiber consisting essentially of a copolymer of PET and adipate and pentaerythritol in which said adipate results from adipic acid added in an amount of between about 1.3 and 3.2 weight percent of TA and DMT, and pentaerythritol is added in the amount from about 175 to about 700 ppm by weight of TA or DMT, said polyester fiber having a modulus of greater than 3.00 g/denier, a tenacity of between 5 and 7 g/denier and a hot air shrinkage of less than 10%.

2. An enhanced polyester fiber according to claim 1 having a modulus of greater than 4.3 g/denier.

3. An enhanced polyester fiber according to claim 1 which comprises a continuous filament.

4. An enhanced polyester fiber according to claim 1 which comprises a staple fiber.

5. A filament yarn formed from the enhanced polyester fiber according to claim 1.

6. A ring-spun yarn according to claim 4 further comprising cotton staple fibers.

7. An open-end spun yarn formed from the staple fibers according to claim 4.

8. A fabric formed from yarns comprising the enhanced polyester fiber of claim 1.

9. A copolymer produced for subsequent melt spinning into an enhanced polyester filament which has the superior combination of tensile, dyeability and shrinkage properties, consisting essentially of PET and ethylene adipate and pentaerythritol in which the ethylene adipate is present in an amount from about 1.3 to about 3.1 weight percent of the copolymer and pentaerythritol is present in the amount from about 150 to about 600 ppm based on the copolymer, and the copolymer has an intrinsic viscosity of at least about 0.5 deciliter per gram, said fiber having the properties of an atmospheric dyeability greater than that of an unenhanced PET produced under identical conditions except for the addition of the adipic acid and pentaerythritol, a modulus of greater than 3.0 g/denier, a tenacity of between 5 and 7 g/denier and hot air shrinkage of less than 10%.

* * * * *